United States Patent [19]
Jartyn

[11] Patent Number: 5,212,430
[45] Date of Patent: May 18, 1993

[54] CONTROL SYSTEM FOR A MACHINE TOOL OR A ROBOT

[75] Inventor: Hermann Jartyn, Burghaslach, Fed. Rep. of Germany

[73] Assignee: Siemens Aktiengesellschaft, Munich, Fed. Rep. of Germany

[21] Appl. No.: 703,883

[22] Filed: May 22, 1991

[30] Foreign Application Priority Data

May 22, 1990 [EP] European Pat. Off. ........ 90109725.3

[51] Int. Cl.$^5$ ..................... G05B 19/18; G05B 19/417
[52] U.S. Cl. ........................................ 318/34; 318/51; 364/474.11; 364/139
[58] Field of Search ................... 364/138, 139, 474.11; 318/592, 34, 51

[56] References Cited
U.S. PATENT DOCUMENTS

| | | |
|---|---|---|
| 4,314,329 | 2/1982 | Crewe et al. .................... 364/141 |
| 4,716,516 | 12/1987 | Dulong .............................. 364/132 |
| 4,841,431 | 6/1989 | Takagi et al. .............. 364/474.11 X |
| 4,931,712 | 6/1990 | DiGiulio et al. .................... 318/625 |
| 4,965,742 | 10/1990 | Skeirik ............................ 364/138 X |
| 5,136,222 | 8/1992 | Yamamoto et al. .............. 318/51 X |

Primary Examiner—William M. Shoop, Jr.
Assistant Examiner—Brian Sircus
Attorney, Agent, or Firm—Kenyon & Kenyon

[57] ABSTRACT

In a numerical control system for controlling a machine tool or a robot, control loops that are not used for the control of drive systems of the tool or robot are utilized to actuate other digital or analog devices. The actual value inputs of these control loops are preferably set to a constant value, such as zero, so that the control loop will switch specified control data through to its output as control signals. The control signals are converted by means of digital-to-analog converters into control voltages.

14 Claims, 1 Drawing Sheet

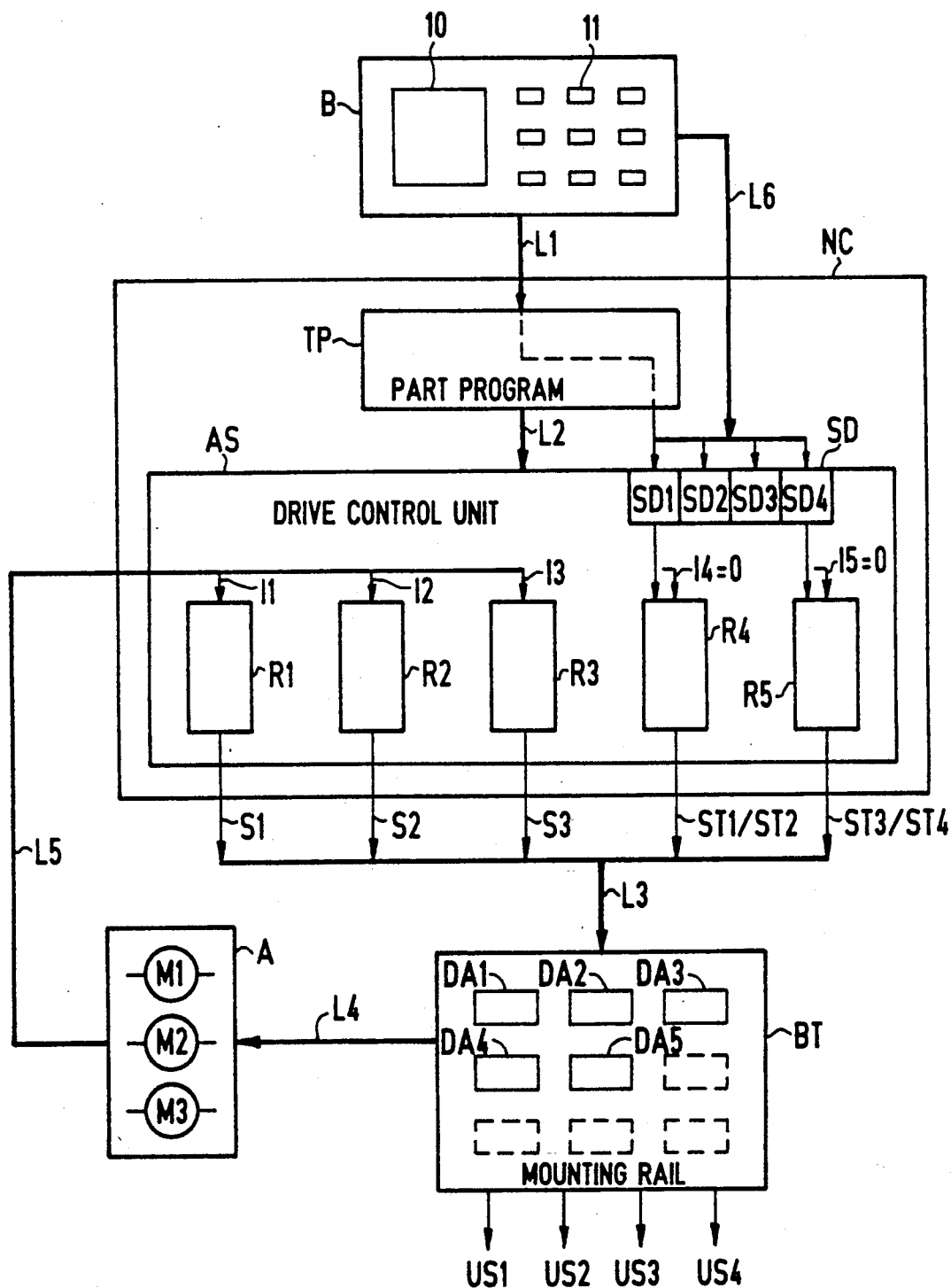

CONTROL SYSTEM FOR A MACHINE TOOL OR A ROBOT

BACKGROUND OF THE INVENTION

The present invention relates to a numerical control section in a control system for controlling a machine tool or a robot. More particularly, the present invention relates to a numerical control section including a part program and a drive control unit, the latter including at least two control loops for the closed-loop control of the drive systems of the machine tool or robot, and digital-to-analog converters to convert the desired-value and actual-value signals of the control loops to analog signals for use in the control system.

To provide for the accurate positioning of the axes of machine tools or robots, control systems with numerical control systems are designed so that closed-loop control of the actual positions of all axes is performed on the basis of specified desired positions. Such numerical control sections essentially consist of a part program and a drive-control or axis-control unit. The part program contains all information that is necessary for executing a particular machining sequence. It is possible to enter input information into the control system through external data-storage devices, such as a programmer, a magnetic tape or a diskette drive, or manually through a keypad on a control panel. The latter can also be used to enter any other information, such as tool data, correction values and machine setup data. Finally, program data may also be sent to the numerical control system directly from the memory of a production control computer.

The desired values for the drives of the systems to be controlled which have been edited by the part program are routed to the respective control loops of the drive-control unit, which then pass them on, by way of digital-to-analog converters and power output stages which follow, to the drives.

Usually incremental and/or absolute measuring systems which are coupled to the drive systems transmit the actual values back to the control loops from the drive-control unit. The latter thus controls the drives of a machine tool or robot through desired-value versus actual-value comparison.

In addition to the drives to be controlled, machine tools or robots may be equipped with further devices which, while they must perform their function on the basis of operating parameters of the machine tool or robot, do not need to be controlled. Illustrative of such devices are pressure pumps, proportional valves, and electric switches. For example, while a press is being operated, an oil pump must be running constantly to produce a lubricating film for the ram of the press. The fact that the oil pump is being operated might be indicated on a display.

Such further devices thus need to receive only a supply voltage or a digital control signal to perform their function. Up to now, these electric signals either had to be fed in separately by the operator or required the use of additional external hardware such as a stored-program controller or, in the simplest case, a constant-voltage source that might take the form of a battery and a potentiometer, for example.

SUMMARY OF THE INVENTION

The present invention provides output control signals for additional devices through the numerical control section typically used for control of machine tools or robots.

In accordance with the present invention, this is accomplished by providing at least one specifiable desired-value signal that is switched through as a control signal to an additional device by way of at least one of a plurality of control loops, with actual-value signals of the particular control loop used for the control signal corresponding to the at least one specifiable desired signal being set to a specified value, preferably zero.

To obtain an analog voltage for an additional device, a control signal for that device is advantageously switched through to a digital-to-analog converter so that the control signal can be taken off as a control voltage at the output of that converter. Since the desired values of the commonly used control loops are routed through digital-to-analog converters in any case for the control of the drives of a machine tool or robot, this design can be readily implemented. Besides, the digital-to-analog converters needed for control are usually accommodated on module mounting rails on which unoccupied mounting locations for additional digital-to-analog converters are available. The control signals can thus be routed to an additional plugged-in digital-to-analog converter, or free inputs and outputs of one of the digital-to-analog converters already used for control can be utilized.

A particular value of a control signal can be specified through a part program of the numerical control system. An additional command is provided therefor in the part program. However, the values of the control signals can also be computed by the part program, allowing for operating parameters of the machine tool or robot. For example, when the velocity of the ram of a press increases, the part program, under the control of the value of the control signal for the oil pump can be increased at the same time through the part program to intensify the lubricating action of the pump.

Advantageously, the value of a particular control signal can also be specified at any time from the control panel. The additional devices can thus be actuated at all times by the user and the values of the control signals specified by the part program can be corrected if necessary.

BRIEF DESCRIPTION OF THE DRAWINGS

The drawing FIGURE illustrates a block diagram representation of an embodiment of the present invention.

DETAILED DESCRIPTION

The illustration, in the form of a block diagram, shows a numerical control section NC with a control panel B, including a display screen 10 and a keypad 11. The control panel is connected to the part program TP of the numerical control section NC through a first line system L1, which may be implemented as a bus system. The numerical control section NC comprises a part program TP as well as a drive- or axis-control unit AS. The latter comprises five control loops R1 to R5, which may be implemented in the form of hardware or software. A third line system L3 connects the numerical control section NC to a module mounting rail BT into which five digital-to-analog converters DA1 to DA5 are plugged. On the mounting rail BT, another four mounting locations, indicated by dashed lines, are available for additional digital-to-analog converters, for example. Through a fourth line system L4, the module mounting rail is connected to the drive system A of the machine tool or robot, which is provided with three servomotors M1, M2 and M3. A power output stage, which as a rule precedes the drive system A, has not been illustrated to keep the diagram uncluttered. A fifth line system L5 connects the drive system A to the drive-control unit AS.

The program data for a machine tool or robot to be controlled can be input through the control panel B. The program data edited in the part program TP are routed to the drive- or axis-control unit AS of the numerical control section NC. In this embodiment, the assumption is made that three drives of a machine tool are to be controlled through the motors M1 to M3. In the drive-control unit AS, three of the control loops, R1, R2 and R3, are used for this purpose. These three control loops cyclically fetch the edited program data of the part program TP and route them as desired data S1, S2 and S3 through the line system L3 to the digital-to-analog converters DA1, DA2 and DA3. The analog voltages of the latter are transmitted over the line system L4 to the drives M1, M2 and M3 of drive system A of the machine tool. The actual values I1, I2 and I3 of the drive system A are detected by means of displacement measuring devices (not shown), which may be of the incremental type, for example, and sent over the line system L5 back to the control loops R1, R2 and R3.

In this embodiment, a digital-to-analog converter DA1 to DA5 is assigned to each control loop R1 to R5. However, each digital-to-analog converter DA1 to DA5 usually has several inputs and outputs and therefore each such converter can process the signals of several control loops R1 to R5.

The operating system of the numerical control section NC of a machine-tool or robot control system, which is not shown in order to keep the diagram uncluttered, is usually capable of, or can at least be provided for the purpose of, handling more control loops R1 to R5 than are needed for the number of drive systems A to be controlled. The "superfluous" control loops then are unused in conventional numerical control systems. In this embodiment, of the five control loops R1 to R5 only three of the control loops, R1 to R3, are used for control.

However, machine tools or robots comprise, in addition to the drive systems A to be controlled, further devices such as pressure pumps, fans, contact assemblies, valves, etc., which only require digital or analog control signals ST1 to ST4 but do not require closed-loop control. The two remaining control loops, R4 and R5 of the drive-control unit AS, can be utilized for the actuation of these additional devices. Since these additional devices only require open-loop control but not closed-loop control, the inputs of R4 and R5 which typically receive the actual values I4 and I5 of the devices they control under closed-loop control are set to a specified value, preferably zero.

The transmission of the values of the control signals ST1 to ST4 to the control loops R4 and R5 takes place by way of a control-data area SD set aside in the drive-control unit AS. The control data SD1 to SD4 can be sent by the user by means of the control panel B and the sixth line system L6 directly to the control-data area SD of the drive-control unit AS. But they can also be input into the part program TP by means of a command to be specifically provided therefor, in which case they are routed by the part program TP directly to the control-data area SD during the execution of the program by way of an internal communications path that is not illustrated. However, the control data SD1 to SD4 can also be computed by the part program TP allowing for operating parameters or operating conditions of the machine tool or robot.

The control loops R4 and R5 may be designed so that each is capable of serially outputting several sets of control data SD1 to SD4 as control signals. As an example, control loop R4 may output the control signals ST1 and ST2, and control loop R5 may output the control signals ST3 and ST4. The control signals ST1 to ST4 are converted by way of specifiable inputs and outputs of the digital-to-analog converters DA4 and DA5 into control voltages US1 to US4.

Assuming that a higher velocity is specified by the part program TP for the control loop R1, which is responsible for the main drive of a press, the part program TP is able to specify at the same time, through the control data SD1 to SD4, a higher value for the lubricant pump of the ram of the press. This value is passed to the control data SD1, for example, where it is cyclically read out by the control loop R4 and routed as control signal ST1 over the line system L3 to the digital-to-analog converter DA4 provided therefor. At the output of the digital-to-analog converter DA4 there then appears a control voltage US1 with which the lubricant pump is operated, by way of an interposed power output stage, if indicated.

The supply voltages commonly used with digital-to-analog converters for machine tools permit analog voltages between ±10 volts to be produced as an output with an accuracy in the millivolt range. Since the actual-value inputs I4 and I5 of the control loops R4 and R5 are set to a specified value, preferably zero, the control loops R4 and R5 act like switches that switch the specified control data SD1 to SD4 through with a constant factor as control signals ST1 to ST4. A voltage value, once computed or specified, can be switched through cyclically, for example, every 7 milliseconds, by way of the digital-to-analog converters. The assignment of the control loops R1 to R5 to the digital-to-analog converters DA1 to DA5 is variable and can be changed in the course of operation.

What is claimed is:

1. A numerical control section in a control system for a machine tool or a robot that has a plurality of drive systems comprising:
   a part program; and
   a drive-control unit comprising:
      a plurality of control loops for closed-loop control of the drive systems of the machine tool or robot, each control loop receiving actual value signals and producing desired-value signals, and a plurality of digital-to-analog converters converting desired value signals from digital to analog values, wherein at least one of said plurality of control loops processes at least one specifiable desired-value signal as a control signal to an additional device to be controlled wherein inputs for the actual-value signals of said at least one control loop used for processing at least one control signal are set to a constant specified value.

2. A control system as defined in claim 1, wherein the control signal corresponding to the processed at least one specifiable desired-value signal is processed through to a digital-to-analog converter and a control voltage corresponding to said control signal is taken off an analog output of said digitial-to-analog converter to which said control signal is processed.

3. A control system as defined in claim 1 wherein a value of said at least one specifiable desired-value signal is specified by said part program.

4. A control system as defined in claim 2 wherein a value of said at least one specifiable desired-value signal is specified by said part program.

5. A control system as defined in claim 3, wherein said value of said at least one specifiable desired value signal is computed by the part program allowing for operating parameters of the machine tool or robot.

6. A control system as defined in claim 4, wherein said value of said at least one specifiable desired value signal is computed by the part program (TP) allowing for operating parameters of the machine tool or robot.

7. A control system as defined in claim 1, wherein a value of said at least one specifiable desired value signal is specifiable by operation of a control panel.

8. A control system as defined in claim 2, wherein a value of said at least one specifiable desired value signal is specifiable by operation of a control panel.

9. A control system as defined in claim 3 further comprising a second specifiable desired-value signal being processed by one of said plurality of control loops wherein a value of said second specifiable desired-value signal is specifiable by operation of a control panel.

10. A control system as defined in claim 4 further comprising a second specifiable desired-value signal being processed by one of said plurality of control loops wherein a value of said second specifiable desired-value signal is specifiable by operation of a control panel.

11. A control system as defined in claim 5 further comprising a second specifiable desired-value signal being processed by one of said plurality of control loops wherein a value of said second specifiable desired-value signal is specifiable by operation of a control panel.

12. A control system as defined in claim 6 further comprising a second specifiable desired-value signal being processed by one of said plurality of control loops wherein a value of said second specifiable desired-value signal is specifiable by operation of a control panel.

13. A control system as defined in claim 1, wherein said additional device includes at least one of a pump, fan, valve or switch.

14. A control system as defined in claim 1, wherein said additional device does not require closed-loop control.

* * * * *